United States Patent
Nos et al.

(10) Patent No.: US 8,990,146 B2
(45) Date of Patent: Mar. 24, 2015

(54) SYSTEMS AND METHODS TO PROVIDE SERVER-SIDE CLIENT BASED CACHING

(75) Inventors: Karl-Peter Nos, Nussloch (DE); Andreas Riehl, Wiesloch (DE); Belenki Michael, Karlsruhe (DE)

(73) Assignee: SAP SE, Walldorf (DE)

( * ) Notice: Subject to any disclaimer, the term of this patent is extended or adjusted under 35 U.S.C. 154(b) by 514 days.

(21) Appl. No.: 12/975,978

(22) Filed: Dec. 22, 2010

(65) Prior Publication Data

US 2012/0166384 A1 Jun. 28, 2012

(51) Int. Cl.
- *G06F 7/00* (2006.01)
- *G06F 17/00* (2006.01)
- *G06F 17/30* (2006.01)
- *G06Q 10/06* (2012.01)

(52) U.S. Cl.
CPC .... *G06F 17/30554* (2013.01); *G06F 17/30539* (2013.01); *G06Q 10/06* (2013.01); *Y10S 707/99933* (2013.01)
USPC .......... 707/602; 707/706; 707/756; 707/769; 707/999.003

(58) Field of Classification Search
CPC .......... G06F 17/30867; G06F 17/2241; G06F 17/30; G06F 17/30138; G06F 17/30557; G06F 17/30566; G06F 17/30719; G06F 17/30902; G06F 17/212; G06F 17/2205; G06F 17/30058; G06F 17/30165
See application file for complete search history.

(56) References Cited

U.S. PATENT DOCUMENTS

| | | | | |
|---|---|---|---|---|
| 7,136,968 B2 * | 11/2006 | Lee | ............................... | 711/141 |
| 7,945,683 B1 | 5/2011 | Ambrose et al. | | |
| 8,117,159 B2 * | 2/2012 | Neumann et al. | ............. | 707/638 |
| 2003/0069746 A1 * | 4/2003 | Kuramatsu | ........................ | 705/1 |
| 2003/0221068 A1 | 11/2003 | Tsuji et al. | | |
| 2004/0225693 A1 * | 11/2004 | Ganji et al. | ................... | 707/201 |
| 2004/0254928 A1 | 12/2004 | Vronay et al. | | |
| 2006/0004739 A1 | 1/2006 | Anthony et al. | | |
| 2006/0112153 A1 * | 5/2006 | Bowen | ......................... | 707/204 |
| 2006/0206454 A1 | 9/2006 | Forstall et al. | | |
| 2007/0088681 A1 | 4/2007 | Aravamudan et al. | | |
| 2007/0094042 A1 | 4/2007 | Ramer et al. | | |
| 2008/0098173 A1 | 4/2008 | Chidambaran et al. | | |
| 2008/0301128 A1 | 12/2008 | Gandert et al. | | |
| 2009/0094187 A1 * | 4/2009 | Miyaki | .............................. | 707/1 |
| 2009/0144234 A1 | 6/2009 | Sharif et al. | | |
| 2009/0276417 A1 | 11/2009 | Shapira et al. | | |
| 2010/0125546 A1 * | 5/2010 | Barrett et al. | ................. | 707/607 |
| 2010/0325100 A1 | 12/2010 | Forstall et al. | | |
| 2011/0047120 A1 | 2/2011 | Kamvar et al. | | |
| 2011/0219023 A1 | 9/2011 | Ambrose et al. | | |
| 2011/0238645 A1 | 9/2011 | Zhang et al. | | |
| 2012/0197864 A1 | 8/2012 | Bourdoncle et al. | | |

\* cited by examiner

*Primary Examiner* — Azam Cheema
(74) *Attorney, Agent, or Firm* — Buckley, Maschoff & Talwalkar LLC (57) ABSTRACT

According to some embodiments, a system, method, means, and/or computer program code are provided to facilitate a display of information on a client device. For example, a server may retrieve first enterprise data from an enterprise database and store the first enterprise data into a first client based cache at the server, the first client based cache being associated with a first user. Similarly, the server may retrieve second enterprise data from the enterprise database and store the second enterprise data into a second client based cache at the server, the second client based cache being associated with a second user. Subsequent to the storing of the first enterprise data, the server may receive a display request from a first client device associated with the first user and transmit the first enterprise data to the first client device.

23 Claims, 6 Drawing Sheets

| USER IDENTIFIER 602 | CACHE DATA 604 | USER PREFERENCES 606 | CLIENT IDENTIFIERS 608 | TIMESTAMP/ LATENCY THRESHOLD 610 |
|---|---|---|---|---|
| U101 | CACHE_101 | DEFAULT | C101 | 12:01AM (JAN 1, 2015) 1 DAY |
| U102 | CACHE_102 | SIZE = 150% | C102, (203)555-1234, 123.456.789.123 | 12:01AM (JAN 1, 2015) 2 HOURS |
| U103 | CACHE_103 | SALES & PROFIT (2015) | WWW.SAP.COM/U103 | 12:02AM (JAN 1, 2015) SALES: 1 HOUR PROFIT: 1 DAY |

SYSTEMS AND METHODS TO PROVIDE SERVER-SIDE CLIENT BASED CACHING

FIELD

Some embodiments of the present invention relate to business information, business intelligence, and/or enterprise systems. In particular, some embodiments relate to systems and methods using server-side client based caching to facilitate a display of information from one or more business information, business intelligence, and/or enterprise system databases.

BACKGROUND

A business information, business intelligence, and/or enterprise system can improve an organization's ability to monitor and manage data in a complex business environment. For example, systems may provide components and tools that allow users to monitor, retrieve, view and manipulate business information, including business warehouse data stored and maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity ("ODBC") and the like.

A user may be interested in retrieving some of the stored business information for a variety of reasons, such as to explore the information or to create a display or report that shows the information. The user may, for example, access a client device (e.g., a personal computer) to view business information from a remote server. The business information might include, for example, information about consumer patterns (e.g., sales order volumes for the current year) displayed in a graphical format. When the client device requests information from the server, the server may retrieve real-time information from one or more enterprise databases and transmit the appropriate data to the client device. Such an approach, however, can be time consuming (e.g., retrieving the real time information from the enterprise databases might take thirty seconds) which can be annoying and frustrating for a user—especially when he or she frequently accesses the business information (e.g., on a home view or overview business information page).

It may therefore be desirable to provide improved methods and systems to facilitate an efficient access and display of business information to a user.

DETAILED DESCRIPTION

To alleviate problems inherent in the prior art, some embodiments of the present invention introduce systems, methods, computer program code and/or means using server-side client based caching to facilitate a display of information from one or more business information, business intelligence, and/or enterprise system databases. Some embodiments are described herein as accessing OnLine Analytic Programming ("OLAP") information associated with a multidimensional data schema. Note, however, that embodiments may be associated with other types of information including data described by a metadata model (e.g., which may itself include metadata structures) associated with the data. Such data can include information stored in one or more data sources, such as relational databases.

Figure 1:
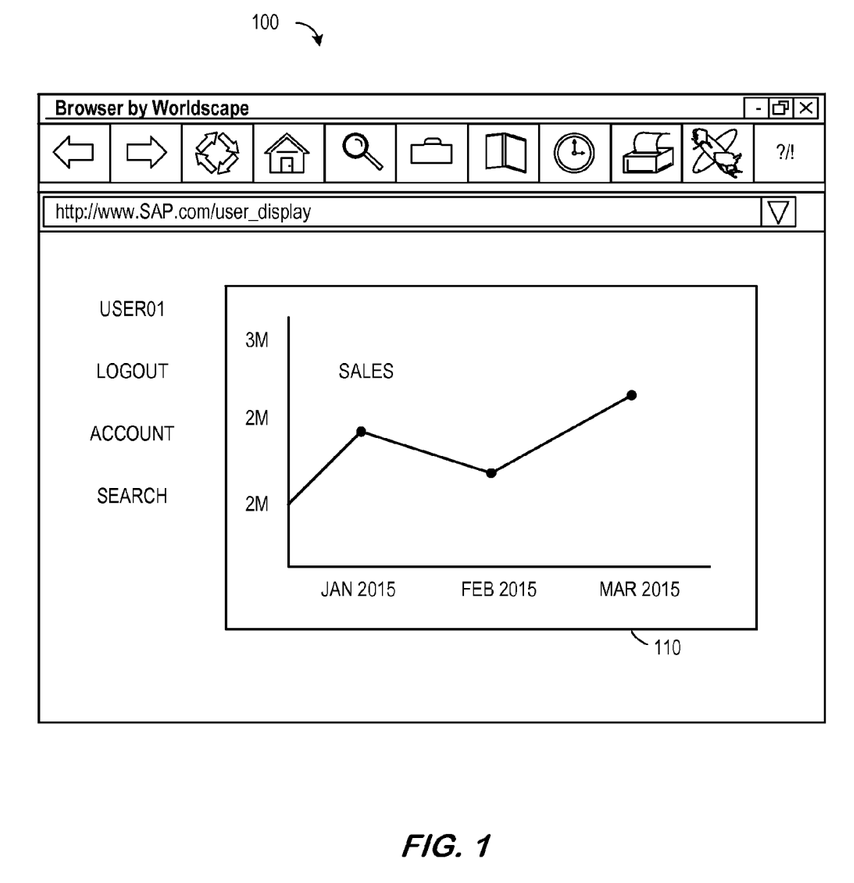
FIG. 1 is an example of a business information display.

FIG. 1 is a block diagram of a business information display 100. The display 100 might be associated with, for example, applications and services in various business areas, such as Customer Relation Management (CRM), Supplier Relation Management (SRM), finances, etc. In some aspects, the display 100 may relate to data provide through a web service, such as a search engine. In accordance with aspects herein, the display 100 may be implemented using any number of programming languages and/or techniques, such as Web Dynpro, Java, the Advanced Business Application Programming (ABAP) language, and other languages. In some embodiments, the display 100 may relate to an enterprise that might store and access business information in a number of different ways. For example, an enterprise might store a substantial amount of information about production, sales, human resources, etc. in one or more database structures created by a business service provider. The display 100 may include a business information portion 110 (e.g., embedded analytics), such as an area graphically representing consumer patterns or other business information that may be of particular interest to a user.

Figure 2:
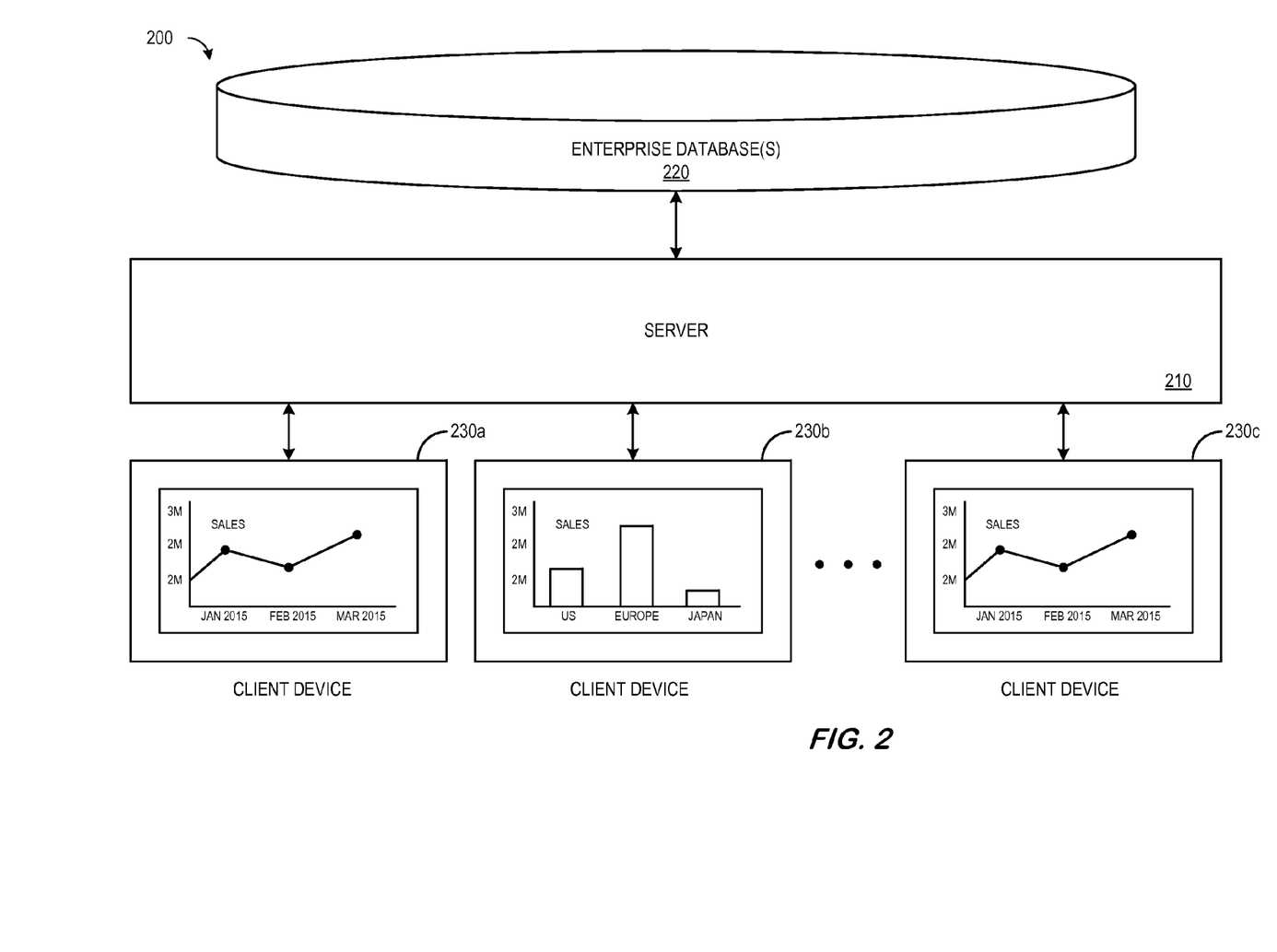
FIG. 2 is a block diagram of a system providing business information to users.

FIG. 2 is a diagram of a system 200 including a back end server 210 that may access information from one or more enterprise databases 220 storing real time business information. Note that the enterprise databases 220 may be remote from or co-located with the server 210. The server 210 may receive display requests from a number of client devices 230a, 230b, 230c and, responsive to those requests, retrieve data from the enterprise databases 220 and provide the appropriate business information to the client devices 230a, 230b, 230c for display to users. Note that different client devices 230 may need to receive different business information (e.g., as illustrated in FIG. 2, client device 230a may display different information as compared to client device 230b).

Such an approach, however, can be time consuming (e.g., retrieving the real time information from the enterprise databases 220 might take thirty seconds) which can be annoying and frustrating for a user—especially when he or she frequently accesses the business information (e.g., on a home view or overview business information page displayed on a client device 230).

Figure 3:
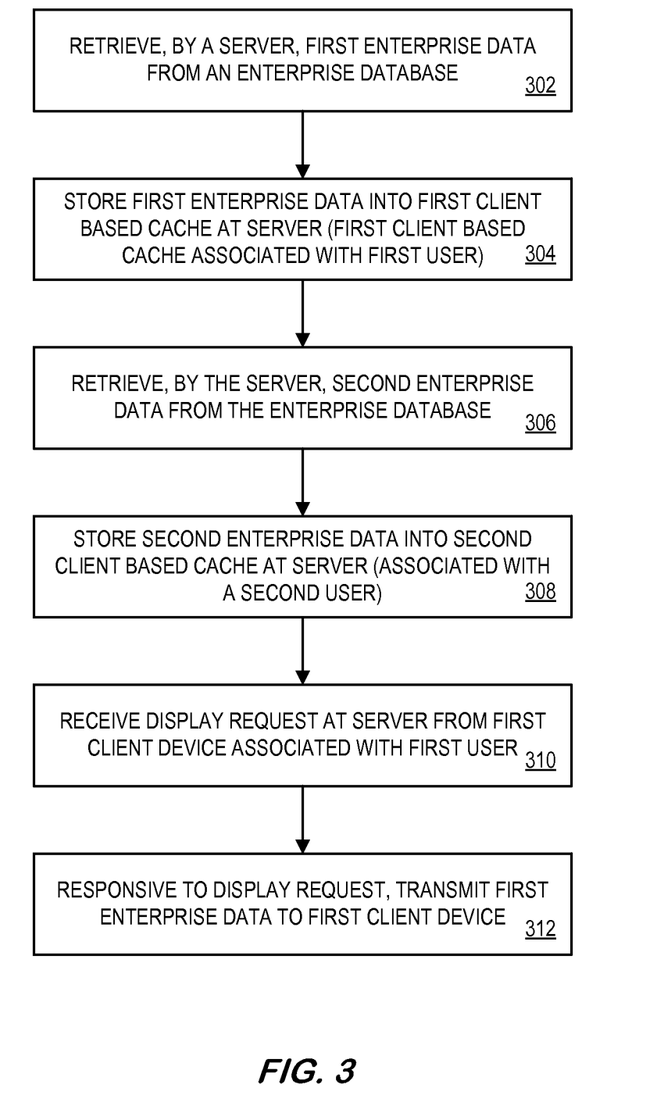
FIG. 3 is a flow diagram of a method according to some embodiments.

It may therefore be desirable to provide improved methods and systems to facilitate an efficient access and display of business information to a user. For example, FIG. 3 is a flow diagram depicting process steps that may be performed according to some embodiments. The flow charts described herein do not necessarily imply a fixed order to the actions, and embodiments may be performed in any order that is practicable. Note that any of the methods described herein may be performed by hardware, software (including low level language code), firmware, or any combination of these approaches. For example, a storage medium may store thereon instructions that when executed by a machine result in performance according to any of the embodiments described herein.

At 302, a server may retrieve first enterprise data from one or more enterprise databases. At 304, the server may store the first enterprise data into a first client based cache at the server. Note that the first client based cache may be, according to some embodiments, associated with a first user. In this way, the first enterprise data may be pre-loaded or pre-fetched for the first user. According to some embodiments, the first enterprise data may be aggregated before being stored into the first client based cache (e.g., multiple values may be combined to determine an overall volume of sales). Similarly, the server may retrieve second enterprise data from the enterprise database at 306, aggregate the data, and then the second enterprise data into a second client based cache at 308. The second client based cache may be, for example, associated with a second user.

After storing the first enterprise data, the server may receive at 310 a display request from a first client device associated with the first user. The first client device might be associated with, for example, a Personal Computer ("PC"), a workstation, a mobile computer, a handheld computer, and/or a wireless telephone. Responsive to the display request, the server may transmit the first enterprise data to the first client device at 312. Similarly, the server might receive a display request from a second client device associated with the second user, and, responsive to the display request, transmitting the second enterprise data to the second client device. Note that the second enterprise data may be different than the first enterprise data. For example, the first enterprise data might represent customer satisfaction scores for the prior three months while the second enterprise data represents average delivery times to various shipping locations.

According to some embodiments, a first time stamp is stored into the first client based cache along with the first enterprise data. Moreover, the server may update the first enterprise data in the first client based cache when the first time stamp exceeds a pre-determined threshold. For example, the server might automatically refresh the first enterprise data when it is more than two hours old. Note that different users might be associated with different thresholds (e.g., a first user might require more recent data as compared to a second user). Further note that different portions of the cached enterprise data might be associated with different thresholds and/or time stamps. In addition, according to some embodiments, the pre-determined threshold (or thresholds) may be adjustable by a user.

According to some embodiments, display preference information is also stored in the server-side client based caches. The display preference information might indicate, for example, which type of information is of interest to the user as well as where and how the information should be displayed. According to some embodiments, the cached data is based on authorizations associated with a requesting user. As a result, it may not be necessary to re-check these authorizations when the information is going to be transmitted to the user. Note that the cache, according to some embodiments, may always be available to one dedicated user (e.g., a technical user). According to some embodiments, the caches maintained by the server are "client based" in that each cache is associated with a particular client device. The caches may also be "client based" in that each cache be associated with a particular user. In that case, the enterprise data and user's preference information may be available even when he or she switches to a different client device.

Figure 4:
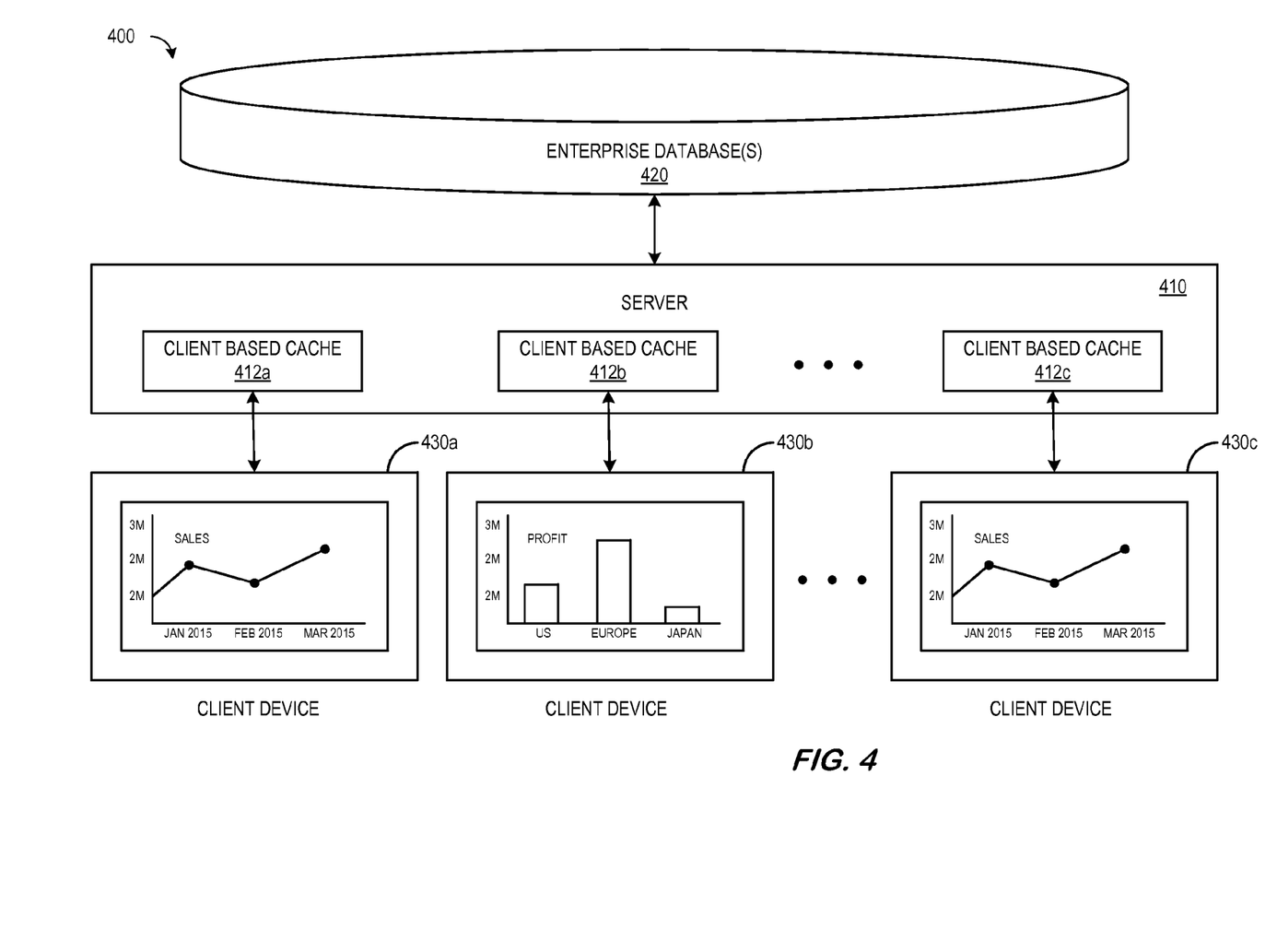
FIG. 4 is a block diagram of a system providing business information to users in accordance with some embodiments.

FIG. 4 is a diagram of a system 400 according to some embodiments of the present invention. The system 100 includes a back end server 410 that may access information from one or more enterprise databases 420 storing real time business information. Note that the enterprise databases 420 may be independent of, remote from, and/or co-located with the server 410. The server 410 may receive display requests from a number of client devices 430a, 430b, 430c. Note that the server 410, enterprise databases 420, and/or client devices 430a, 430b, 430c might exchange information over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode ("ATM"), Internet Protocol ("IP"), Hypertext Transfer Protocol ("HTTP"), and/or Wireless Application Protocol ("WAP"). Moreover, although only a single server 410 and enterprise database 420 are illustrated in FIG. 4, note that any number of such devices may be provided in accordance with embodiments described herein.

As illustrated in FIG. 4, the server 410 may maintain a client based cache 412a, 412b, 412c for each client device 430a, 430b, 430c and/or each user. The server 410 may retrieve information from the enterprise databases 420 in order to pre-load the client based cache 412a, 412b, 412c as appropriate. Note that different client devices 430 may need to be pre-populated with different business information (e.g., as illustrated in FIG. 4, client device 430a may display different information as compared to client device 430b). According to some embodiments, only information authorized to be viewed by a particular client or user is placed into the corresponding client based cache 412a, 412b, 412c. According to some embodiments, the cached data may always be based on the authorizations of a requesting user. As a result, it may not be necessary to re-check the authorizations when the cache is accessed (e.g., the cache may always be available for a dedicated user, such as a technical user).

Note that the client based caches 412a, 412b, 412c might be associated with user interface control framework and/or a shared object to buffer an initial data grid for each user and report. In that case, business information runtime data (e.g., in the enterprise database 420) might only be accessed if there is no valid shared object instance available (or there is a subsequent interaction step, such as a navigation, change selection, or change presentation).

When a display request is subsequently received from one of the client devices 430a, 430b, 430c, the server can transmit the data from the appropriate client based cache 412a, 412b, 412c to facilitate a display of the information in a relatively quick fashion (e.g., it might take only one second to respond to a display request as compared to the thirty seconds described with respect to FIG. 2).

Moreover, a total cost of ownership associated with the system 400 may be reduced because of smaller memory requirements. For example, while a typical report might need 100 megabytes of memory to execute, the server-side client based caches 412a, 412b, 412c described herein might only require around 16 kilobytes (e.g., when data for consumer patterns is highly aggregated). If there is not enough memory to support the client based caches 412a, 412b, 412c, according to some embodiments the oldest entries may be automatically deleted.

Figure 5:
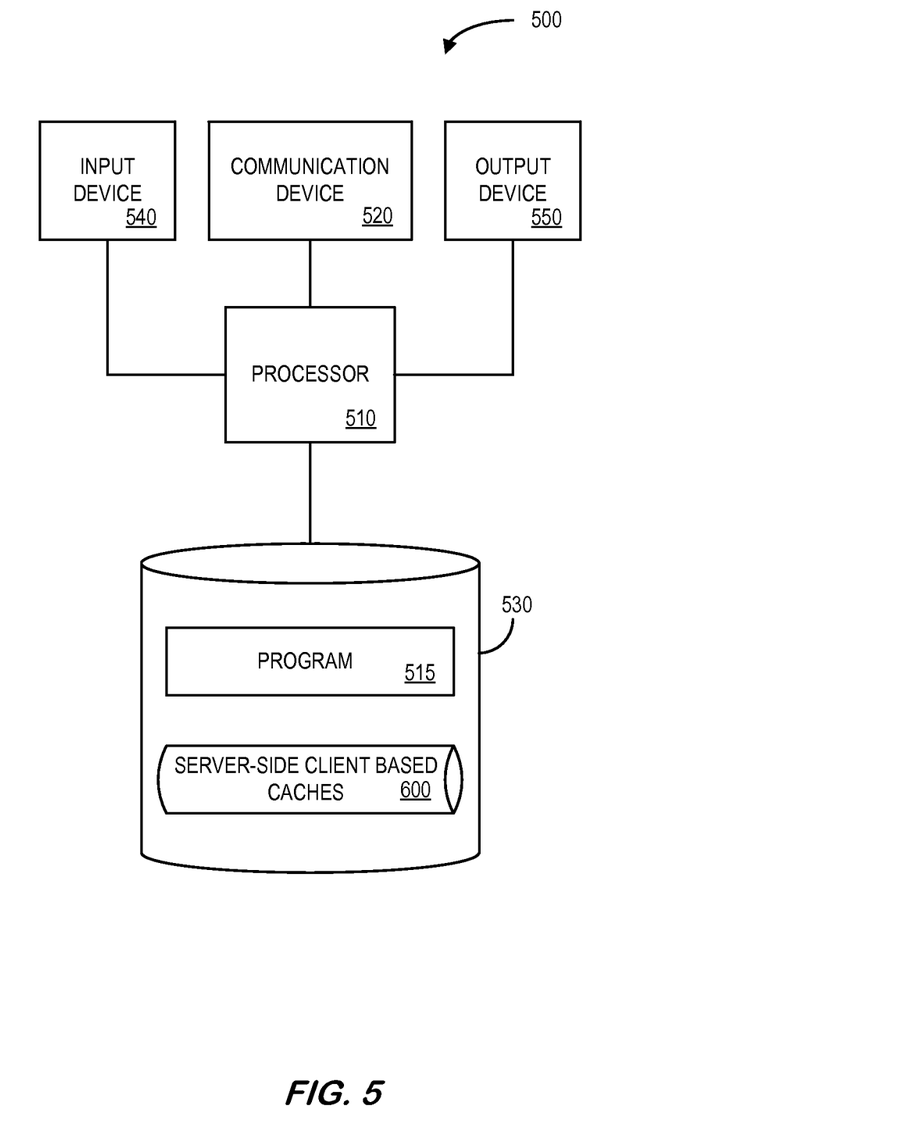
FIG. 5 is a block diagram of a server platform in accordance with some embodiments.

FIG. 5 is a block diagram of a server platform 500 in accordance with some embodiments of the present invention. The server platform 500 might, for example, execute a spreadsheet application and a spreadsheet plug-in or module similar to analyzer module 50 illustrated in FIG. 1. The server platform 500 comprises a processor 515, such as one or more processors, coupled to a communication device 520 configured to communicate via a communication network (not shown in FIG. 5). The communication device 520 may be used to exchange information with enterprise databases and/or client devices.

The processor 515 is also in communication with an input device 540. The input device 540 may comprise, for example, a keyboard, a mouse, or computer media reader. Such an input device 540 may be used, for example, to define latency and/or authorization rules. The processor 515 is also in communication with an output device 550. The output device 550 may comprise, for example, a display screen or printer. Such an output device 550 may be used, for example, to provide reports and/or display business information to an administrator.

The processor 515 is also in communication with a storage device 530. The storage device 530 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

Figure 6:
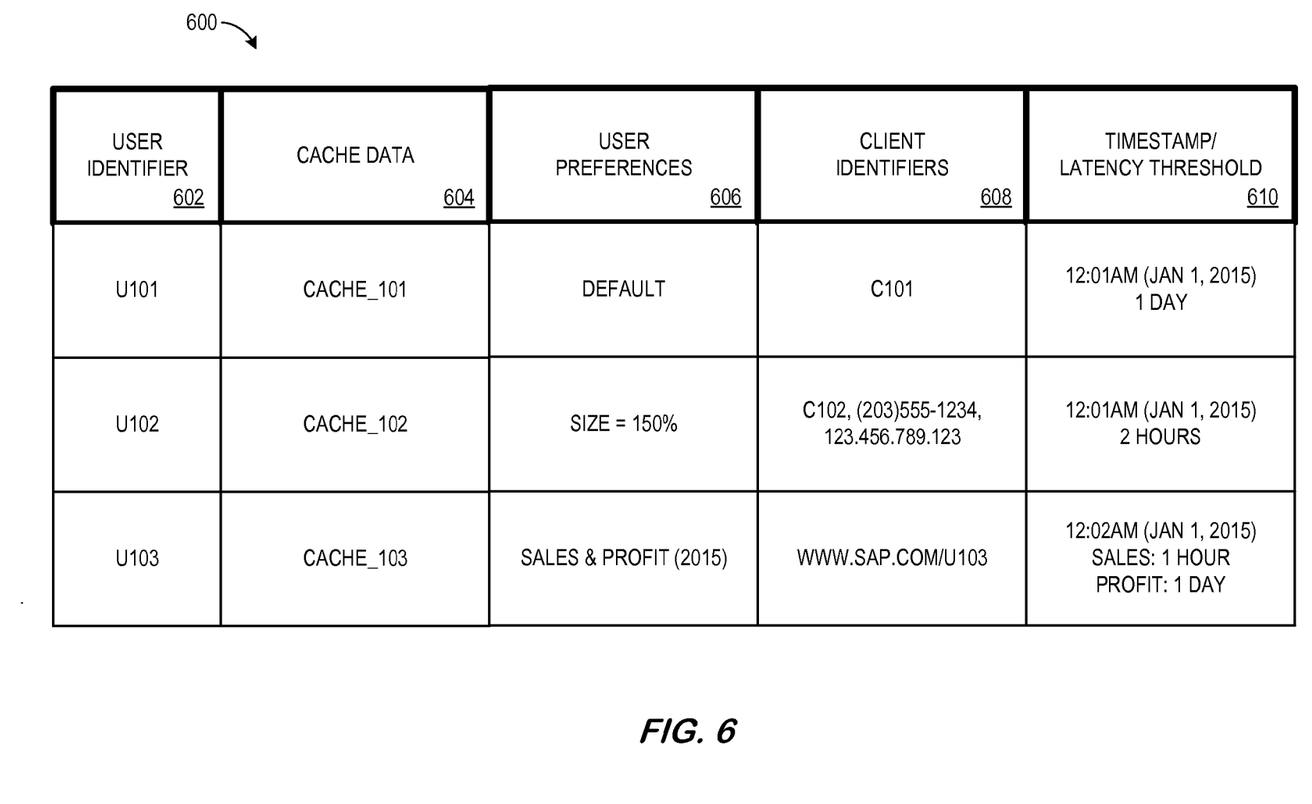
FIG. 6 is an illustration of server-side client based caches according to some embodiments.

The storage device 530 stores a program 515 for controlling the processor 515. The processor 515 performs instructions of the program 515, and thereby operates in accordance any embodiments of the present invention described herein. For example, the processor 515 may retrieve first enterprise data from an enterprise database and store the first enterprise data in one of the server-side client based caches 600. Similarly, the processor 515 may retrieve second enterprise data from the enterprise database and store the second enterprise data in another of the server-side client based caches 600. Subsequent to the storing of the first enterprise data, the processor 515 may receive a display request from a first client device associated with a first user and transmit the first enterprise data from the appropriate cache to the first client device.

As used herein, information may be "received" by or "transmitted" to, for example: (i) the server platform 500 from other devices; or (ii) a software application or module within the server platform 500 from another software application, module, or any other source. As shown in FIG. 5, the storage device 530 also stores the server-side client based caches 600. An example of a database that might be used in connection with the sever platform 500 will now be described in detail with respect to FIG. 6. The illustrations and accompanying descriptions of the databases presented herein are exemplary, and any number of other database arrangements could be employed besides those suggested by the figures.

Referring to FIG. 6, a table represents the server-side client based caches 600 that may be stored at the server platform 500 according to an embodiment of the present invention. The table includes entries each identifying a cache including data pre-fetched from one or more enterprise databases. The table also defines fields 602, 604, 606, 608, 610 for each of the entries. The fields specify: a user identifier 602, cache data 604, user preferences 606, client identifiers 608, and time stamp and/or latency thresholds 610. The information in the server-side client based caches 600 may be created and updated, for example, by a server and/or a client device.

The user identifier 602 may be a unique alphanumeric code associated with a particular user. The user identifier 602 might be associated with, for example, a user name and/or password. The cache data 604 represents the information that has been pre-fetched for that particular user from one or more enterprise databases (e.g., embedded analytic data or other business information). The user preferences 606 may indicate which types of data should be displayed to user and/or how he or she would like to view the information. The client identifiers 608 may be one or more codes or communication addresses associated with client devices. The time stamp and/or latency thresholds 610 may be used to determine when the cache information should be refreshed.

The illustration and accompanying descriptions of devices and databases presented herein are exemplary, and any number of other arrangements could be employed besides those suggested by the figures. For example, multiple databases associated with different types of business information might be associated with the server platform 500. Similarly, the server-side client based caches may store different types of additional information that may be helpful when matching user entered name strings with database members, such as spelling variations (including misspellings and country-specific spelling variations), aliases (e.g., nicknames), and/or language variations (e.g., translated names).

As a result of embodiments described herein, a user may be able to view business information more quickly as compared to prior approaches. Moreover, embodiments may reduce memory requirements while still providing sufficient information to a user. Note that embodiments described here may significantly improve a Total Cost of Ownership ("TCO") due to reduced server and database loads as well as a reduce in memory requirement. For example, without a cache an additional 50 Mbytes of memory might need to be allocated with each report execution. Moreover, according to some embodiments, the cache may be pre-filled during times of low server load.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the applications and databases described herein may be combined or stored in separate systems). Similarly, although a particular information flow and user interactions have been given as examples, other and/or additional steps may be performed in accordance with any embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions, to facilitate access to information stored in an enterprise database, that when executed by a processor result in the following:
   retrieving, by a server, first enterprise data from the enterprise database;
   after the first enterprise data retrieved from the enterprise database is aggregated, storing the aggregated first enterprise data into a first client based cache at the server, the first client based cache being associated with a first user and not a second user;
   retrieving, by the server, second enterprise data from the enterprise database;
   storing the second enterprise data retrieved from the enterprise database into a second client based cache at the server, the second client based cache being associated with the second user and not the first user;
   subsequent to the storing of the aggregated first enterprise data into the first client based cache that is at the server and associated with the first user and not the second user, receiving at the server a display request from a first client device associated with the first user; and
   responsive to the display request, transmitting, to the first client device, the aggregated first enterprise data that was stored in the first client based cache that is at the server and associated with the first user and not the second user;
   wherein a first time stamp is stored into the first client based cache along with the first enterprise data;
   wherein execution of the instructions by the processor further results in:
      updating the first enterprise data in the first client based cache when the first time stamp exceeds a pre-determined threshold;
   wherein different users are associated with different thresholds;
   wherein different portions of the first enterprise data are associated with different thresholds;
   wherein the pre-determined threshold is adjustable by the first user; and
   wherein aggregating comprises combining multiple values to determine a total amount.

2. The medium of claim 1, wherein execution of the instructions by the processor further results in:
   receiving at the server a display request from a second client device associated with the second user; and
   responsive to the display request, transmitting the second enterprise data to the second client device, wherein the second enterprise data is different than the first enterprise data.

3. The medium of claim 1, wherein different portions of the first enterprise data are associated with different time stamps.

4. The medium of claim 1, wherein the first and second enterprise data are received from a plurality of enterprise databases.

5. The medium of claim 1, wherein execution of the instructions by the processor further results in:
   receiving, at the server, a display request from a third client device associated with the first user; and
   responsive to the display request from the third client device, transmitting the first enterprise data to the third client device.

6. The medium of claim 1, wherein the first client device is associated with at least one of: (i) a personal computer, (ii) a workstation, (iii) a mobile computer, (iv) a handheld computer, or (v) a wireless telephone.

7. The medium of claim 1, wherein a first user display preference is stored in the first client based cache along with the first enterprise data.

8. The medium of claim 1, wherein the first client device and the second client device are separate from one another and the server.

9. The medium of claim 1, wherein the first client device exchanges information with the server over a network that is used to transmit information between separate devices.

10. The medium of claim 1, wherein the first client device exchanges information with the server over a network using Internet Protocol.

11. A system, comprising:
   a server independent of a first client device and coupled to an enterprise data store, wherein the server includes one or more processors and is to:
   prior to receiving a display request from the first client device, retrieve first enterprise data from the enterprise data store,
   prior to receiving the display request from the first client device, aggregating the first enterprise data retrieved from the enterprise data store and then storing the aggregated first enterprise data into a first client based cache at the server, the first client based cache being associated with a first user and not a second user,
   retrieve second enterprise data from the enterprise data store,
   store the second enterprise data retrieved from the enterprise data store into a second client based cache at the server, the second client based cache being associated with the second user and not the first user,
   receive the display request from the first client device, and
   responsive to the display request, transmit, to the first client device, the aggregated first enterprise data that was stored in the first client based cache that is at the server and associated with the first user and not the second user;
   wherein a first time stamp is stored into the first client based cache along with the first enterprise data;
   wherein the server is further to:
      update the first enterprise data in the first client based cache when the first time stamp exceeds a pre-determined threshold;
   wherein different users are associated with different thresholds;
   wherein different portions of the first enterprise data are associated with different thresholds;
   wherein the pre-determined threshold is adjustable by the first user; and
   wherein aggregating comprises combining multiple values to determine a total amount.

12. The system of claim 11, further comprising:
   the enterprise data store containing first enterprise data and second enterprise data.

13. The system of claim 12, further comprising:
   the first client device independent of the enterprise data store, wherein the first client device is to transmit the display request.

14. The system of claim 13, wherein the enterprise data store is a real time enterprise data store.

15. The system of claim 12, wherein the enterprise data store is a real time enterprise data store.

16. The system of claim 11, wherein the enterprise data store is a real time enterprise data store.

17. The system of claim 11, wherein the server further comprises a storage device.

18. The system of claim 11, wherein the first client device and the second client device are separate from one another and the server.

19. A method to facilitate a display to a user of information stored in a database, comprising:
    retrieving, by a server, first enterprise data from the enterprise database;
    after the first enterprise data retrieved from the enterprise database is aggregated, storing the aggregated first enterprise data retrieved from the enterprise database into a first client based cache at the server, the first client based cache being associated with a first user and not a second user;
    retrieving, by the server, second enterprise data from the enterprise database;
    storing the second enterprise data retrieved from the enterprise database into a second client based cache at the server, the second client based cache being associated with the second user and not the first user;
    subsequent to the storing of the aggregated first enterprise data, receiving at the server a display request from a first client device associated with the first user; and
    responsive to the display request, transmitting, to the first client device, the aggregated first enterprise data that was stored in the first client based cache that is at the server and associated with the first user and not the second user;
    wherein the server comprises one or more processors;
    wherein a first time stamp is stored into the first client based cache along with the first enterprise data;
    the method further comprising:
        updating the first enterprise data in the first client based cache when the first time stamp exceeds a pre-determined threshold;
    wherein different users are associated with different thresholds;
    wherein different portions of the first enterprise data are associated with different thresholds;
    wherein the pre-determined threshold is adjustable by the first user; and
    wherein aggregating comprises combining multiple values to determine a total amount.

20. The method of claim 19, further comprising:
    receiving at the server a display request from a second client device associated with the second user; and
    responsive to the display request from the second client device, transmitting the second enterprise data to the second client device, wherein the second enterprise data is different than the first enterprise data.

21. The method of claim 20, wherein a first time stamp is stored into the first client based cache along with the first enterprise data.

22. The method of claim 19, wherein the server further comprises a storage device.

23. The method of claim 19, wherein the first client device and the second client device are separate from one another and the server.

* * * * *